Nov. 20, 1962  G. A. WEINGARTNER  3,064,536
REAR VISION MIRROR ASSEMBLY
Filed Feb. 7, 1956  2 Sheets-Sheet 1

INVENTOR.
Gerald A. Weingartner
BY
Popp and Sommer
ATTORNEYS.

Nov. 20, 1962  G. A. WEINGARTNER  3,064,536
REAR VISION MIRROR ASSEMBLY
Filed Feb. 7, 1956  2 Sheets—Sheet 2
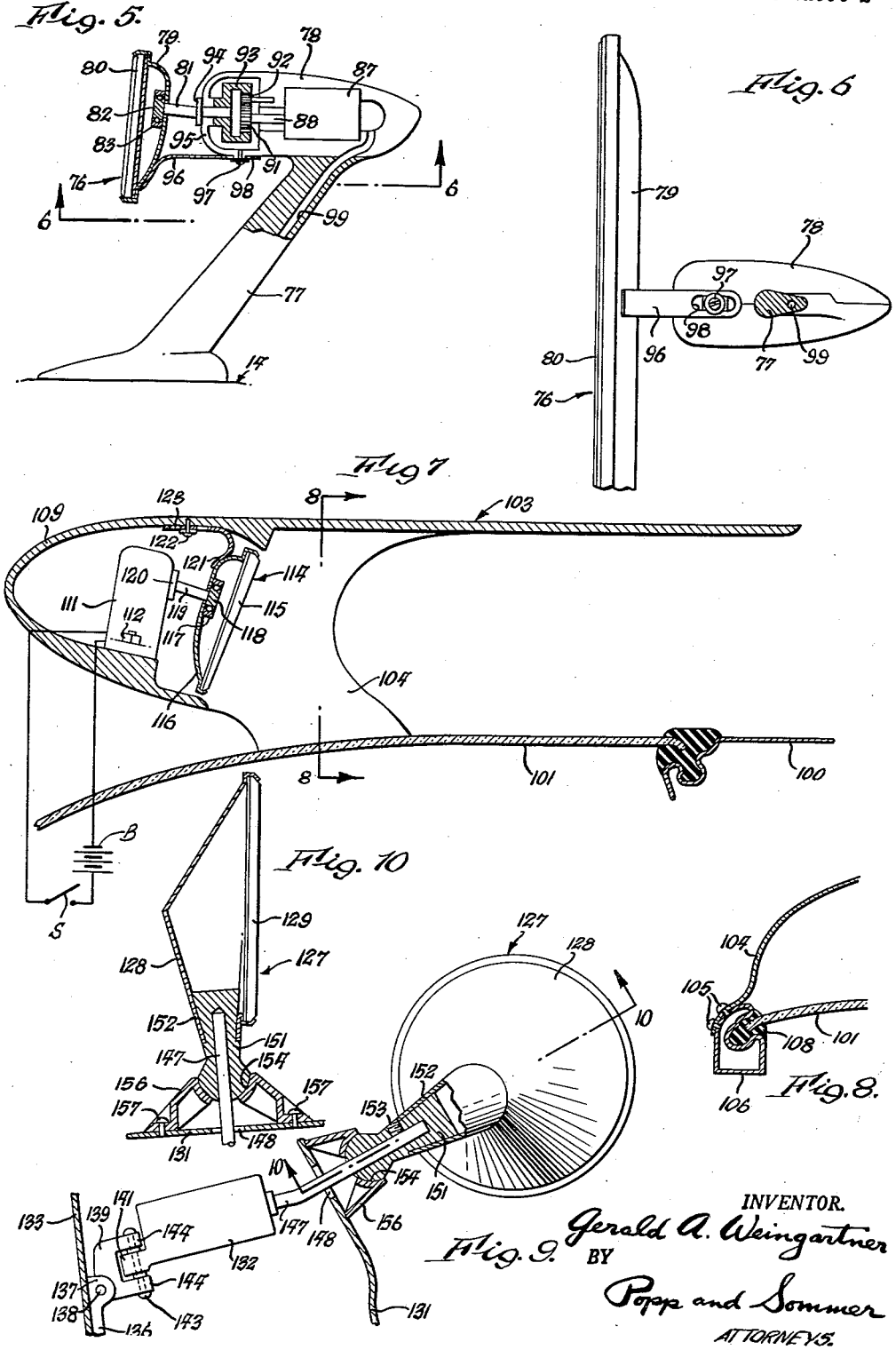
INVENTOR.
Gerald A. Weingartner
BY
Popp and Sommer
ATTORNEYS.

3,064,536
REAR VISION MIRROR ASSEMBLY
Gerald A. Weingartner, Grand Island, N.Y., assignor to Standard Mirror Company, Inc., Buffalo, N.Y., a corporation of New York
Filed Feb. 7, 1956, Ser. No. 563,868
2 Claims. (Cl. 88—93)

This invention relates to rear vision mirror assemblies and is particularly concerned with such assemblies in which the mirror is located exteriorly of the vehicle on which it is mounted.

It is a principal object of the present invention to provide a rear vision mirror of the character described which is adjustable by means operable from the interior of the vehicle.

Another object of the invention is to provide an adjustable rear vision mirror assembly which includes a protective housing for the mirror thereof.

A further object of the invention is to provide an adjustable rear vision mirror assembly in which the mirror may be mounted in such position as to permit a very wide field of view.

Another object of the invention is to provide an adjustable rear vision mirror assembly of the character described which is simple and durable in construction and is easily operated.

Other objects and advantages of the present invention will be apparent from the following description taken in conjunction with the accompanying drawings in which:

FIGURE 5 is a sectional view of another modification in which an elongated mirror is employed;

FIGURE 6 is a sectional view taken on the line 6—6 of FIGURE 5;

FIGURE 7 is a longitudinal sectional view of still another modified form of rear vision mirror assembly according to the present invention;

FIGURE 8 is a detail sectional view taken on the line 8—8 of FIGURE 7;

FIGURE 9 is a sectional view of yet another modified form of rear vision mirror assembly according to the present invention; and FIGURE 10 is a sectional view taken on the line 10—10 of FIGURE 9.

Figure 1:
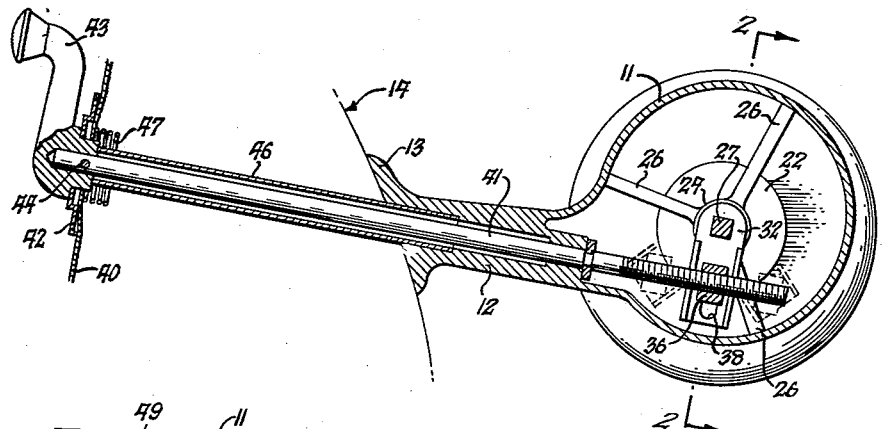
FIGURE 1 is a sectional view of an adjustable, rear vision mirror assembly including adjusting means therefor.
Figure 2:
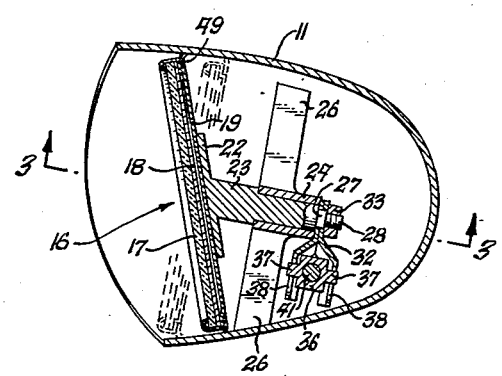
FIGURE 2 is a sectional view taken on the line 2—2 of the mirror and the mounting therefor shown in FIGURE 1.
Figure 3:
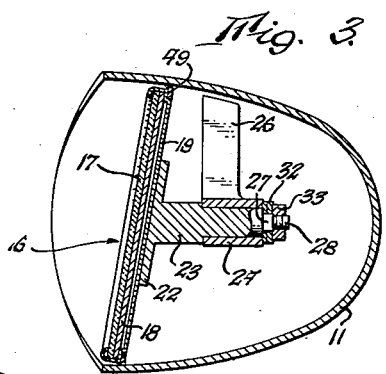
FIGURE 3 is a sectional view similar to FIGURE 2 taken on the line 3—3 of FIGURE 2.

One embodiment of a rear vision mirror assembly constructed in accordance with the present invention is illustrated in FIGURES 1–3. As there shown, the assembly comprises a housing 11 having a tubular support 12, the outer end 13 of which is enlarged and adapted to be secured by suitable means to the body, indicated generally at 14, of the vehicle on which the assembly is mounted. For presenting a streamlined appearance the housing 11 is preferably, as seen in FIGURE 2, spheroidal or parabolic in longitudinal section and it may conveniently be formed integrally with the support 12. The housing and support may be made of any suitable material such as metal or plastic. A mirror 16 is removably and adjustably mounted within the housing 11.

The mirror 16 comprises a circular glass mirror panel 17, a backing 18 and a case 19. The rear face or surface of the panel 17 is silvered or made reflective in accordance with conventional or any other desired practice. Both the mirror panel and the backing 18, which is preferably formed from a sheet of cardboard or other somewhat resilient material, are secured in the case 19. This case is of light-gage metal and the marginal portion thereof is, as best shown in FIGURES 2 and 3, turned over to embrace the periphery of the mirror panel 17.

Concentrically arranged on the outer face of the case 19, as by soldering, welding, or the like, is a plate 22 from which there extends a shaft 23. This shaft is disposed at an acute angle to the axis of the mirror that passes through the centers of its faces and is hence disposed at an angle other than a 90° angle to the faces, or front and rear surfaces, of the mirror. The shaft 23 is mounted for rotation in a journal 24 provided in a spider 26 formed within the housing 11. At its outer end the shaft 23 is provided with a reduced, squared portion 27 and a further reduced threaded portion 28. Since the axis of the journal 24 is angularly disposed to the center line of the housing 11 and since the shaft 23 is angularly disposed to the axis of the mirror 16, it will be evident that rotation of the shaft 23 in the journal 24 will produce a wobbling nutating movement of the mirror, as indicated by the broken lines in FIGURE 2.

FIGURE 1 illustrates means which may be employed for moving or adjusting the mirror 16 from a distance. Such adjusting means preferably comprises a slotted, bifurcated lever 32, the upper end of which is provided with a squared orifice adapted to fit over and snugly engage the squared portion 27 of the shaft 23. A nut 33 threadedly engages the portion 28 of the shaft 23 to secure the lever 32 in place. Between the arms of the lever 32 there is provided a nut 36 having projecting portions 37 which are slidably movable within vertical slots 38 in the arms of the lever. The nut 36 is threadedly engaged on the outer end of a rod 41 that extends through the support 12 and through the body 14 of the vehicle to the interior thereof. In the embodiment illustrated in FIGURES 1–3, the portion of the rod 41 within the vehicle is enclosed by a tube 46, one end of which is inserted in the base of the support 12. The other end of the tube 46 is engaged in an escutcheon or cover plate 42 that rests against the inner body wall 40 of the vehicle. The rod 41 extends through the wall 40 and has a handle 43 secured thereon by a pin 44. A coiled, compression spring 47 is mounted in the wall 40 and bears against the escutcheon 42 to hold it tightly against the handle 43.

Rotation of the rod 41 by the handle 43 causes longitudinal movement of the nut 36 on the rod and consequent movement of the shaft 23 with accompanying movement of the mirror 16. It will be observed that with the mirror housing 11 arranged with its open end in a particular position with respect to an observer rotation of the mirror by the shaft 23 will, because of the disposition of the shaft at an angle other than 90° with the rear mirror face, cause the field of view reflected by the mirror panel 17 to such observer to continually change. When the assembly is used, for example, on an automobile, only a slight rotary movement of the mirror will be required to provide the adjustment of the reflected field of view made necessary by change in the position of the observer within the automobile or by change of observer. Nevertheless, there is possible a wide range in the adjustment of the mirror so that all portions of a large area may, if desired, be observed by reflection from the mirror plate 17 by merely turning the handle 43.

It will be observed that the mirror 16 is located well within the open end of the housing 11. This is desirable since the housing shields the mirror from rain and also cuts off part of the glare from the top and sides. To minimize entrance of dirt, rain and other detrimental materials to the inner portion of the housing 11, a sealing ring 49 of resilient material, such as rubber or the like, is attached as by adhesive to the circumference of the mirror 16. The outer edge of the ring 49 remains in contact with the interior wall of the housing as the mirror rotates, thereby sealing off the inner housing portion.

Figure 4:
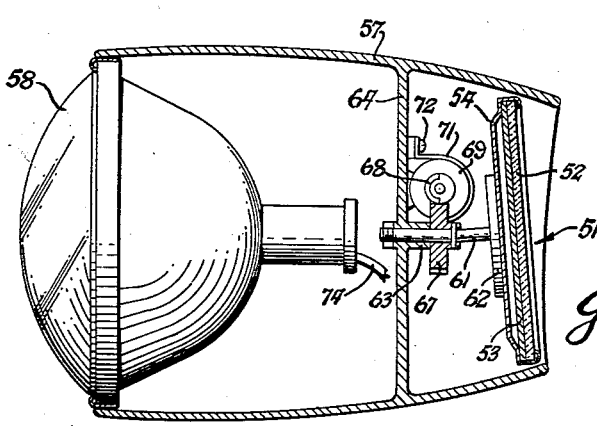
FIGURE 4 is a sectional view similar to FIGURE 2 of a modified rear vision mirror assembly.

A modification of the rear vision mirror shown in FIGURES 1–3 is illustrated in FIGURE 4. In this modification the mirror 51 which comprises a mirror panel 52, a resilient backing member 53, and a case 54, all similar to the corresponding elements of the mirror 16, is rotatably supported in a housing 57 which also encloses a spotlight 58. The housing 57 may be mounted in any convenient manner for movement with respect to the body of the vehicle that will permit the desired use of the spotlight. The mirror 51 is adjustably mounted within the housing 57 so that in many positions of the housing the desired view to the rear of the vehicle may be reflected therefrom to an occupant of the vehicle.

Like the mirror 16 in FIGURES 1–3, the mirror 51 may be adjusted without touching the mirror itself. In the instant embodiment, the mirror 51 is supported within the housing 57 on a shaft 61 which is attached or, if desired, formed integrally with a mounting plate 62 that is firmly secured to the rear of the case 54. The shaft 61 is bent so that the faces of the mirror are not normal to the axis of the outer, principal portion of the shaft. The inner portion of the shaft is rotatably held in a journal 63 formed in a partition 64 of the housing 57 and has secured thereto between the journal 63 and the mirror a worm gear 67 which is engaged by a worm 68 on the shaft of an electric motor 69. The latter is mounted on the parttition 64 by suitable means such as the strap 71 and screws 72 and is connected by conducting wires (not shown) to a suitable source of electric power and a switch or other controlling device by which the motor may be started and stopped. The operation of this mechanism to adjust the rear vision mirror 51 is similar to that of the apparatus shown in FIGURES 1–3 in that because of the shaft 61 being angular in part, rotation thereof will cause the mirror to wobble and thus permit the desired reflected view to be obtained therefrom. The stoplight 58 may be of any conventional or desired construction. The lamp therein (not shown) is provided with electric current through the cable 74.

FIGURES 5 and 6 illustrate another modified form of rear vision mirror incorporating the invention of the present application. In this modification which is similar in some respects to the embodiment shown in FIGURES 1–3, the rear vision mirror 76 is supported on a pedestal or post 77 one end of which is enlarged and adapted for mounting on the body 14 of a vehicle. On the other, outer end of the pedestal 77 there is formed, preferably integrally, a housing 78. The mirror 76 in this embodiment is generally of conventional construction and comprises a horizontally elongated mirror plate 80 mounted in a case 79, of thin metal, that projects outwardly from the back of the mirror.

The case 79 is supported by a shaft 81. One end of the shaft 81 projects into the case midway between the ends thereof where it is provided with an enlarged portion 82 rotatably mounted within an antifriction bearing 83 that is secured to the inside of the case. The other end of the shaft 81 extends into the housing 78 and is there operatively connected with an electric motor 87 by a speed reducing gear train. This gear train comprises a pinion 91, secured on the motor shaft 88, that engages an idler pinion 92. The latter pinion engages with the interior teeth of a ring gear 93 which is secured by any suitable means on the end of the shaft 81. To prevent endwise movement of the shaft 81 and ring gear 93 a collar 94 is provided on the former outside the endwall 95 of the housing 78 in which the shaft 81 is rotatably supported.

As indicated in FIGURE 5, the shaft 81 is slightly bent. Consequently rotation of the shaft 81 by the motor 87 through the pinions and gears 91, 92 and 93 will produce a wobbling movement of the mirror 76. The field of view reflected to an occupant of the vehicle may thereby be easily adjusted and changed by merely supplying electric current to the motor 87 through suitable wiring (not shown). The speed reducing gearing provided between the motor shaft 88 and the shaft 81 facilitates precise positioning of the mirror.

Although the shaft 81 is free to turn in the bearing 83 there may be some tendency for the whole mirror 76 to turn with the shaft 81. To prevent this one end of a finger 96 is secured by suitable means, such as welding or soldering, to the outside of the case 79. At its other end the finger 96 is slidably secured to the motor housing 78 as by a screw 97 passing through the slot 98 in the finger. The finger is not bound by the screw 97 and is at all times free to slide toward or away from the housing 86 as the position of the mirror 76 may change. The housing 78 is preferably made sectional to permit easy access to the mechanism therein and a passage or a duct 99 is provided in the post or pedestal 77 for convenience in leading electrical wiring (not shown) to the motor 87.

A fourth embodiment of the present invention is illustrated in FIGURES 7 and 8. This embodiment is intended for use with a vehicle 100 in which a canopy or windshield 101 projects so far over the seat of the driver or operator of the vehicle as to make mounting of a rear vision mirror centrally within the vehicle unfeasible. The rear vision miror in this modification is combined with a sun visor or shade 103 located above and substantially parallel to the top of the canopy or windshield 101. As shown in FIGURE 8 the ends 104 of the sun visor 103, which is preferably constructed of sheet metal, are brought down at the sides of the vehicle and attached, as by rivets 105, to the channel member 106 that supports the edges of the canopy and in which such edges are sealed in rubber or other suitable plastic material 108.

As shown in FIGURE 7 the forward portion 109 of the visor or shade 103 is in the form of a hollow spheroidal housing shaped so as to provide non-turbulent air flow thereover. Within the visor portion 109 there is housed a motor and speed reducer 111 which may be secured in place therein by bolts 112. There is also provided within the housing portion 109 a mirror 114 provided with a mirror panel 115 and case 116 in the rear portion of which there is secured an anti-friction bearing 117 substantially like that shown in FIGURE 5. Rotatably journalled in and supporting the bearing 117 is the enlarged end 118 of a shaft 119 extending from the motor and speed reducer 111, the bearing for this shaft being designated at 120. This motor can be energized from the automobile battery B under control of a manual switch S.

As will be seen in FIGURE 7, outwardly of the speed reducer the shaft 119 is bent so as to produce a wobbling movement of the mirror 114 when the shaft rotates. The mirror 114 is preferably elongated in a horizontal direction and is prevented from rotating with the shaft 119 by a finger 121. One end of the finger is secured as by welding or soldering to the top of the case 116 and its other end is provided with a longitudinal slot 123 through which there extends a mounting screw 122 that is secured to the visor portion 109. Rotation of the mirror 114 with the shaft 119 is thus prevented although the mirror is free to move with respect to the housing 109 since the screw 122 does not clamp the finger 121. The field of view reflected from the mirror 114 will, of course, continually change as the shaft 119 rotates. Consequently by operating the motor 111 the mirror may be adjusted to provide the desired view for the driver or operator of the vehicle. As shown, the glass panel 115 of the mirror 114 is prismoidal and provided with a metallic or other reflecting coating on the back surface thereof. By adjusting the vertical angularity of the mirror about an axis generally parallel with both of the reflective surfaces a high intensity image may be reflected from the reflective coating on the panel 115 or a low intensity image (useful to reduce glare) may be reflected from the front face of the prismoidal panel. Movement of the mirror by rotation of the shaft 119 will allow the desired image to be obtained.

The visor 103 may extend across the full width of the vehicle 100 or it may be shorter and only cover a portion of the width thereof. Likewise the mirror 115 may extend for substantially the full length of the visor or may be shorter. Obviously also two or more mirrors similar to the one above described may be mounted in the housing 109 in order to provide a broader and more comprehensive field of view. Electric current for the motor within the housing portion 109 may be supplied by suitable wires or cables (not shown) led in suitable fashion to the interior of the vehicle. Control of the mirror adjustment from inside the vehicle is easily accomplished by opening or closing the electrical circuit leading to the motor. The use of a speed reducer further facilitates the mirror adjustment since it makes the mirror movement slow enough to prevent overrunning the desired position.

Still another embodiment of the present rear vision mirror invention is illustrated in FIGURES 9 and 10. As shown in FIGURE 9 the mirror 127, which comprises a mirror panel 129 carried by the case 128, is adapted to be installed outside the outer wall 131 of a vehicle body while the motor and speed reducer 132, preferably enclosed in a single casing, for adjusting it is movably mounted within the space between the outer wall 131 and the inner wall 133. In such space there is mounted on the wall 133 a bracket 136 having spaced lugs 137 and a pivot pin 138 providing for the pivotal movement of an intermediate bracket 139 about a horizontal axis. Movement of the motor 132 about a more or less vertical axis is provided for by mounting the motor on the intermediate bracket 139 by a projecting lug 141 and a pin 143 that passes through the lug 141 and the ears 144 of the bracket 139 between which the lug 141 is located. The motor and speed reducer 132 is thus capable of pivotal motion in any direction.

Projecting outwardly from the free end of the motor and speed reducer 132 is a shaft 147 which is bent as seen in FIGURE 9, and extends through an orifice 148 in the outer vehicle wall 131 into a longitudinal bore formed in a ball joint member 151, in which it is secured as by a set screw 153. The inner end of the member 151 is clamped within an extension or enlargement 152 of the case 128 while the outer end thereof is rounded to form a substantially spherical surface and is seated within a socket 154 formed in the base 156. The latter is secured by screws or bolts 157 to the wall 131 of the vehicle around the orifice 148. Since the shaft 147 is bent its rotation produces a wobbling movement of the mirror 127 as well as rotation. Rotation of the shaft 147 may be obtained by supplying electrical current to the motor 132 through conducting means (not shown) and thus adjustment of the mirror panel 129 to obtain the desired view therein may be secured without direct contact with the mirror. The pivotal mounting of the motor and speed reducer 132 is provided to prevent binding of the shaft 147 as it turns.

A common characteristic of the several embodiments of the present invention hereinabove described is the provision with each of the mirrors of a rotatable shaft, at least a portion of which is disposed at an angle other than 90° to the rear face of the mirror panel. As above described this arrangement produces a wobbling movement of the mirror as the shaft revolves and permits adjustment of the mirror to obtain, within wide limits, any desired reflected view. As the shaft can be rotated by means controllable at a distance, for example from inside a vehicle on which the mirror is mounted, it is obvious that the invention provides a convenient way of adjusting a rear vision mirror. Such convenience, of course, contributes to driving safety since the proper adjustment of the mirror will not ordinarily be omitted or delayed as may be the case if it is necessary to manually adjust it directly. Safety is also promoted by the present invention because the distant adjustment made possible hereby allows mirrors to be placed in positions which would not ordinarily be convenient. Better vision may be thus obtained.

It will be understood that various further modifications and variations may be made in the details of construction of the several embodiments shown and described. Thus, for example, numerous other known mechanical devices may be used to rotate the shaft 23 in the embodiment illustrated in FIGURES 1–3 instead of the linkage shown. Or, if desired, the rod 41 may be rotated by an electric motor. Similar variations in construction may be made in the other disclosed embodiments in accordance with space or design requirements. Such changes and others may, of course, be made without departing from the spirit of the invention. Accordingly, it is intended that the invention shall not be considered limited to the structures shown and described, but shall be construed as broadly as permitted by the appended claims.

I claim:

1. A rear vision mirror assembly, comprising a mirror panel having a reflective face, a shaft on the side of said mirror opposite its reflective face and extending in a direction opposite to said reflective face, bearing means rotatably connecting one end of said shaft to said mirror panel, the axis of the other end of said shaft being disposed at an acute included angle to said reflective face of said mirror panel, motor means rotatably supporting said other end of said shaft to rotate about its said axis, whereby rotation of said shaft by said motor means nutates said mirror panel and its reflective face is progressively directed to different vertical and horizontal directions and means preventing rotation of said mirror panel with said shaft whereby a mirror which is out-of-round in outline will remain level in all rotative positions of said shaft.

2. A rear vision mirror assembly as set forth in claim 1 wherein said last means comprises a member fast to said mirror panel and projecting generally parallel with said other end of said shaft, and a pin and a slot connection between said member and a stationary part.

References Cited in the file of this patent

UNITED STATES PATENTS

| | | |
|---|---|---|
| 2,085,000 | Borba et al. | June 29, 1937 |
| 2,456,362 | Aves | Dec. 14, 1948 |
| 2,696,142 | Langford | Dec. 7, 1954 |
| 2,724,995 | Matner | Nov. 29, 1955 |
| 2,737,852 | Porter et al. | Mar. 13, 1956 |
| 2,862,420 | Hazelroth | Dec. 2, 1958 |